D. WEIR.
CHUCK.
APPLICATION FILED APR. 3, 1917.
1,288,324.
Patented Dec. 17, 1918.
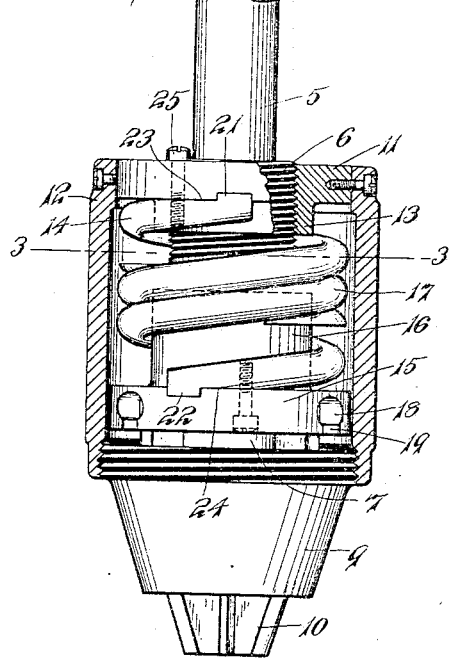
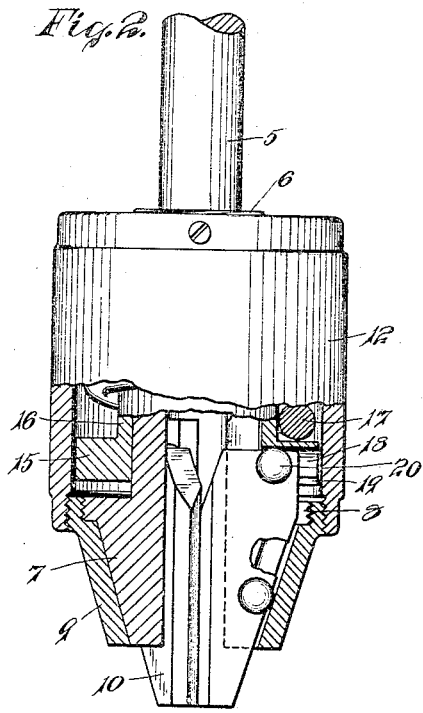
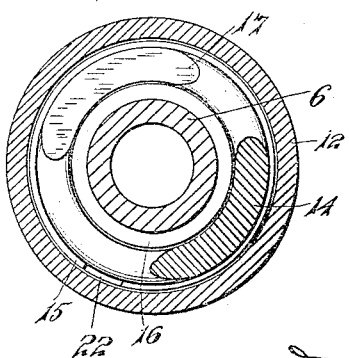
INVENTOR.
David Weir,
BY
Arthur B Jenkins
ATTORNEY.

UNITED STATES PATENT OFFICE.

DAVID WEIR, OF HARTFORD, CONNECTICUT, ASSIGNOR, BY DIRECT AND MESNE ASSIGNMENTS, TO THE HARTFORD SPECIAL MACHINERY COMPANY, OF HARTFORD, CONNECTICUT, A CORPORATION OF CONNECTICUT.

CHUCK.

1,288,324.      Specification of Letters Patent.      Patented Dec. 17, 1918.

Application filed April 3, 1917. Serial No. 159,408.

*To all whom it may concern:*

Be it known that I, DAVID WEIR, a citizen of the United States, residing at Hartford, in the county of Hartford and State of Connecticut, have invented a new and useful Improvement in Chucks, of which the following is a specification.

My invention relates more especially to that class of chucks known as drill chucks, and an object of my invention, among others is to provide a chuck that shall be simple in its construction and particularly efficient in its method of operation.

One form of chuck embodying my invention and in the construction and use of which the objects herein set out, as well as others, may be attained, is illustrated in the accompanying drawings, in which:

Figure 1 is a view in section through the actuating sleeve of a drill chuck embodying my invention and with parts broken away to show construction.

Fig. 2 is a view in side elevation of my improved chuck with the lower part broken away to show construction.

Fig. 3 is a view in cross section on plane denoted by dotted line 3—3 of Fig. 1.

In the accompanying drawings the numeral 5 indicates the lower end of a drill spindle and 6 a chuck body having a recess within which the spindle is frictionally held in a manner common to devices of this class.

A head 7 is formed at the lower end of the chuck body and is provided with jaw slots 8 and a sleeve 9 that fits the tapered outer surface of the head to inclose and cover said slots. Chuck jaws 10 are located within these slots and bear against the tapered inner surface of the sleeve 9 in their closing movement, in a manner common to devices of this kind. An actuating plate 11 has a central opening, screw threaded to fit the screw threaded upper end of the chuck body, said plate being located within and secured to the upper end of an actuating sleeve 12 comprising the greater part of the outer surface of the chuck, the lower end of which sleeve is secured to the tapered sleeve 9 as by interengaging screw threads. A supporting neck 13 projects downwardly from the inner surface of the plate 11 and surrounds the upper end of the chuck body. A carrier actuator 14, of spiral form, is seated against the plate 11 and surrounds the neck 13, one end of said actuator having a lug 21 projecting within the plate 11 to which it is securely fastened.

A carrier 15 is mounted to slide upon the chuck body, as shown in Fig. 2 of the drawings, said carrier having a flange 16 projecting for a considerable distance away from the carrier. A carrier support 17 is secured to the carrier, this support being also of spiral form and it is seated against the carrier 15 and closely encircles the flange 16 that acts as a support for said actuator, the end of which preferably does not extend a great distance beyond the end of said flange. The end of this support has a lug 22 that projects into an opening in the carrier and is securely fastened therein as by means of a screw passing from the opposite side of the carrier into a threaded opening in the support, the manner of fastening both the actuator and the support being alike. The pitch of the spiral of this support is substantially the same as that of the actuator 14, the parts being so arranged that said actuator and support 17 will each rest and move within the spaces between the turns of the other member, and as shown in Fig. 1 of the drawings, the parts being so arranged that they will not be disengaged.

The flange 16, it will be seen, forms a support for both the actuator 14 and the support 17 at the points where they interengage one with the other, and the actuator and support closely intermeshing, each supports the other and together they comprise a firm, positive connection, and at the same time a more or less yielding connection between the plate 11 and the carrier 15.

Radially extending recesses 18 in the carrier receive balls 20 loosely fitting recesses in the upper ends of the chuck jaws 10, that extend through slots 19 into said recesses, and by means of which the jaws are secured to the carrier.

It will readily be seen that rotation of the sleeve 12 will move the carrier along the chuck body 6 and operate the jaws 10, that are opened and closed by acting against the tapered inner surface of the sleeve 9 in a manner that will be readily understood, and as set forth in my patent dated May 8, 1917, No. 1,225,089, and to which patent reference is hereby made for such understanding of the construction and operation of such parts as may not be gained herefrom, the invention herein disclosed being an improvement on the device shown in my said patent.

The actuator 14 and support 17 are each provided with flat seats 23—24 that rest respectively against the plate 11 and carrier 15, and said actuator and support are preferably formed flat to seat against the said plate or carrier whenever the sleeve 12 is turned sufficiently to cause said parts to touch one another.

The screws 25 may engage with any desired part of the end of the actuator or carrier, but substantially the point of engagement herein shown is preferred.

In accordance with the provisions of the patent statutes, I have described the principles of operation of my invention, together with the device which I now consider to represent the best embodiment thereof; but I desire to have it understood that the device shown is only illustrative and that the invention can be carried out by other means.

I claim—

1. A chuck body, a carrier slidably mounted on said body, an actuating sleeve, and connections between said sleeve and carrier including two members of spiral form, each of which is located and moves within the space between the turns of the other member.

2. A chuck body, a carrier slidably mounted on the body, an actuating plate, means for actuating the plate, and two members of spiral form connecting said plate and carrier, each of said members being located and moving within the space between the turns of the other member.

3. A carrier, an actuating plate, a neck projecting from one of said members, a chuck body on which said carrier and plate are mounted, means for actuating the plate, and two members of spiral form connecting said plate and carrier, each of said members being located and moving within the space between the turns of the other member and one of said members being supported by said neck.

4. A carrier, an actuating plate, a neck projecting from one of said members, a chuck body on which said carrier and plate are mounted, and two members of spiral form connecting said plate and carrier, each of said members being located and moving within the space between the turns of the other member and one of said spirally arranged members inclosing said neck and projecting beyond the end thereof.

5. A carrier, an actuating plate, a neck projecting from one of said members, a chuck body on which said carrier and plate are mounted, means for actuating the plate, a member of spiral form inclosing said neck, and a member of spiral form secured to and projecting from the carrier and with its end projecting into and moving within the space between the turns of the other member of spiral form and adapted to be supported by said neck.

6. A carrier, an actuating plate, a neck projecting from one of said members, a chuck body on which said carrier and plate are mounted, an actuating sleeve inclosing the chuck mechanism and secured to said plate, a member of spiral form surrounding said neck and secured to said plate, and a member of spiral form secured to and projecting from said carrier and with its turns intermeshing within the space between the turns of the other member of spiral form and adapted to be supported by said neck.

7. A carrier, an actuating plate, a neck projecting from one of said members, a chuck body on which said carrier and plate are mounted, an actuating member of spiral form supported by said neck, a supporting member of spiral form secured to the carrier and adapted to extend onto and be supported by the neck and having its turns extending into the space between the turns of said actuating member, and an actuating sleeve secured to said plate.

8. A chuck body, a carrier slidably mounted on said body, an actuating sleeve, an actuator rigidly connected with said sleeve and extending in a spiral path within said sleeve, and a support rigidly connected with said carrier and extending in a spiral path into the space between the turns of said actuator and engaging the same on diametrically opposite sides thereof.

DAVID WEIR.

Copies of this patent may be obtained for five cents each, by addressing the "Commissioner of Patents, Washington, D. C."